United States Patent [19]
Mori et al.

[11] Patent Number: 5,357,830
[45] Date of Patent: Oct. 25, 1994

[54] CABLE CUTTING APPARATUS WITH MECHANISM FOR PREVENTING ERRONEOUS CABLE CUTTING

[75] Inventors: Tadashi Mori; Masao Sakata; Kou Wada; Toshihiko Odagiri, all of Tokyo, Japan

[73] Assignee: NTT Fanet Systems Corporation, Tokyo, Japan

[21] Appl. No.: 85,984

[22] Filed: Jul. 1, 1993

[30] Foreign Application Priority Data

Jul. 1, 1992 [JP] Japan .................................. 4-174372

[51] Int. Cl.$^5$ ............................................ B26B 17/00
[52] U.S. Cl. .................................... 83/13; 30/90.1; 30/91.2; 30/186
[58] Field of Search .................... 83/13, 366, 370, 371, 83/372, 399, 400; 30/90.1, 91.2, 175, 182, 186, 179, 202

[56] References Cited

U.S. PATENT DOCUMENTS

| | | | |
|---|---|---|---|
| 3,378,924 | 4/1968 | Porter | 30/91.2 |
| 3,872,746 | 3/1975 | Wittes et al. | 30/90.1 |
| 4,078,303 | 3/1978 | Wiener | 30/90.1 |
| 4,835,862 | 6/1989 | Phillips | 30/90.1 |

FOREIGN PATENT DOCUMENTS

0133016  5/1990  Japan .................................. 30/90.1

*Primary Examiner*—Douglas D. Watts
*Assistant Examiner*—Raymond D. Woods
*Attorney, Agent, or Firm*—Allegretti & Witcoff, Ltd.

[57] ABSTRACT

A cable cutting apparatus incorporating a mechanism for preventing the erroneous cutting of the cables in use, which is both inexpensive and simple. This cable cutting apparatus includes a cutting mechanism having cutting blades for cutting a cable; a core potential recognition unit for recognizing a potential of the cutting blades brought into contact with a core of the cable as one of a potential for a cable in use and a potential for a cable out of use; and a locking mechanism for locking cutting movements of the cutting blades of the cutting mechanism whenever the core potential recognition unit recognizes the potential of the cutting blades in contact with the core of the cable as the potential for a cable in use.

20 Claims, 5 Drawing Sheets

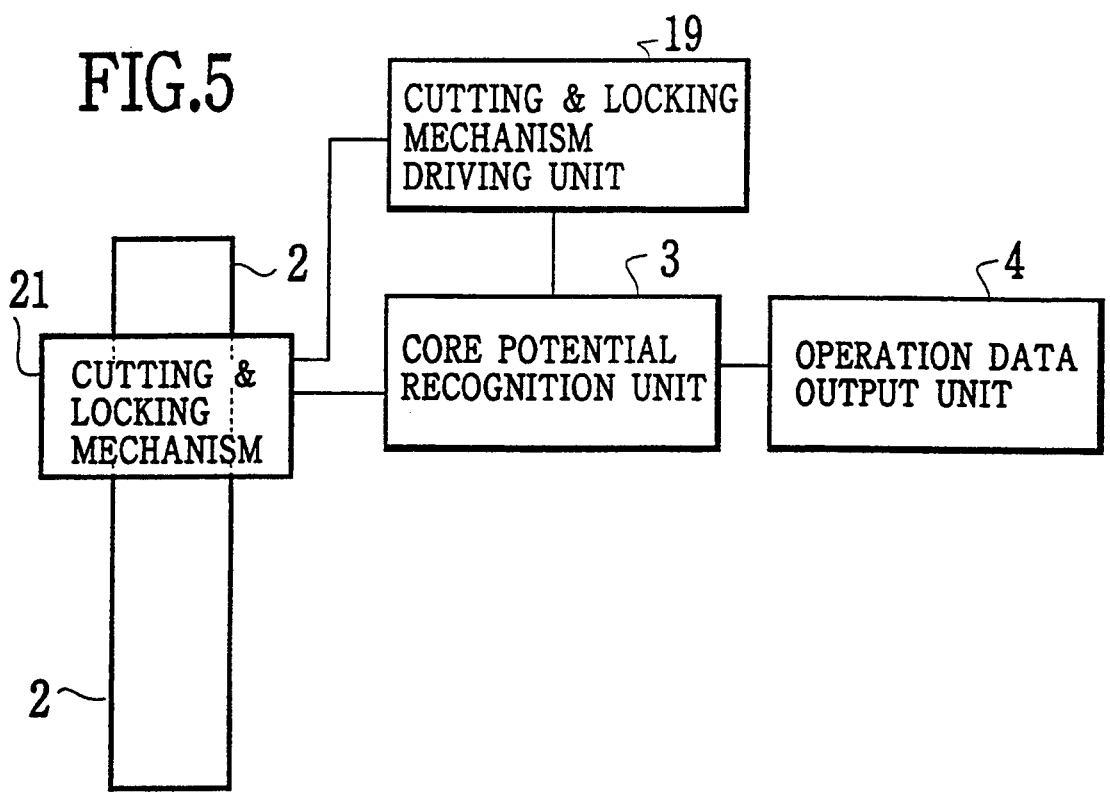
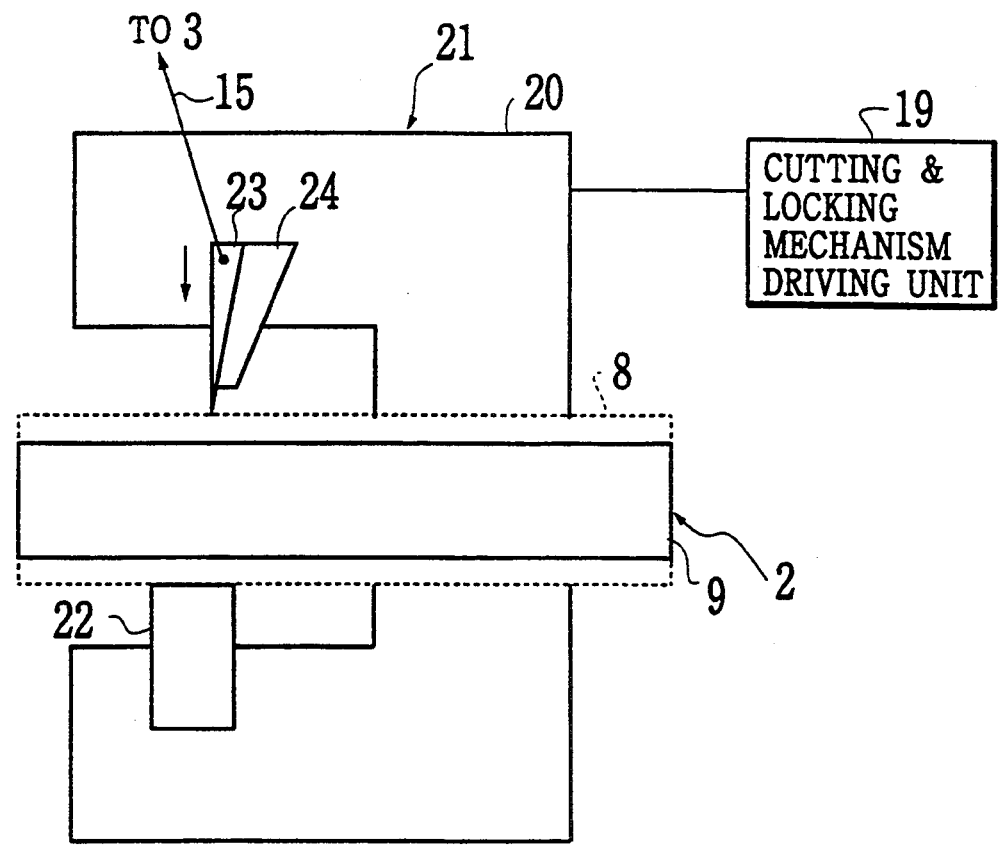

CABLE CUTTING APPARATUS WITH MECHANISM FOR PREVENTING ERRONEOUS CABLE CUTTING

BACKGROUND OF THE INVENTION

1. Field of the Invention

The present invention relates to a cable cutting apparatus to be used in cable handling works for cutting cables such as signal transmission cables and power supply cables.

2. Description of the Background Art

The cables such as the signal transmission cables and the power supply cables are important means for conveying information or energy to distant places. Because such cables are to be connected between distant places, such cables are usually laid in a form of a bundle of a plurality of cables through telephone tunnels, telegraph poles, raceways, racks, etc. In such a bundle of cables, an individual cable is distinguished from the other cables of the bundle by the feature such as its thickness, a color of its covering material, a material of its covering material, etc.

However, the bundle of cables usually contains several tens to several hundreds of cables together, so that it is almost inevitable for any bundle to contain more than one cables of the same kind. Consequently, in order to distinguish each cable clearly, it has been necessary for each cable to be attached with a number of tags indicating a type or a use of each cable, at regular intervals along each cable.

Now, in recent years, as our society becomes increasingly information-oriented, a number of cables to be laid has been increasing considerably, such that a huge number of old and new cables are now laid within a rather narrow cable laying space available. In addition, in conjunction with the rapid progress of various data processing devices, a demand for the cable handling works such as cable location changing works, cable type changing works, and cable removing works is also increasing considerably.

For example, in order to remove or change a location of an old data processing device, there is a need to carry out an old cable handling work at a cable laying space at which the old cable is located. In such an old cable handling work, as the cable laying space becomes narrower, the proper checking of the tags attached to the cables becomes increasingly difficult, and as a result, there is an increasing amount of danger to cut off the cable in use by mistake.

In general, the cable handling work is carried out in the procedure of checking a location to carry out the cable handling work on a cable layout design specification in advance, and then carrying out the following four operations at the actual work cite: (1) cutting of the old cable; (2) pulling out of the old cable; (3) reeling out of the new cable; and (4) laying of the new cable; where the operations (3) and (4) are unnecessary in a case of the cable removing work. In any case, the operation (1) of the cutting of the old cable is the step that requires the most caution in the cable handling work, because in a case of cutting off the cable in use by mistake, an operation to re-connect the erroneously cut off cable together requires an operation time which is several tens to several hundreds times that of the cable cutting operation.

In order to avoid such a trouble related to an erroneous cutting of a cable in use, a cutting target cable recognition apparatus has been employed conventionally, as shown in FIGS. 1A and 1B.

Namely, in FIG. 1A, an old cable 103 is connected between two old data processing devices 101 and 102, and laid along with other cables in use 104, 105, and 106 of the type similar to that of the old cable 103 which are connected between other data processing devices (not shown).

Usually, the old data processing devices 101 and 102 themselves are located outside of a view field of a cable handling worker working in a cable laying space, so that the cable handling worker is required to pick out the old cable 103 from a number of similar cables.

To this end, conventionally, the old cable 103 is disconnected from the old data processing devices 101 and 102, and a standard identification signal of 270 Hz from a signal injector 108 attached at one end of the disconnected old cable 103. Then, the identification signal transmitted through the old cable 103 is detected by a weak signal detector 110 placed in a vicinity of the old cable 103 and a detection by the weak signal detector 110 is indicated to the cable handling worker by a signal indicator 111 connected with the weak signal detector 110, such that the cable handling worker can identify the old cable 103 to be cut off, non-destructively.

More specifically, as shown in FIG. 1B, the signal injector 108 is attached to one end 107 of the disconnected old cable 103, while another end 109 of the disconnected old cable 103 is closed by Joining the signal lines so as to loop back the signal transmitted through the old cable 103. Then, the identification signal of 270 Hz is injected by the signal injector 108 and transmitted through the old cable 103. Then, the identification signal transmitted through the old cable 103 is detected by the weak signal detector 110 placed by the cable handling worker in a vicinity of the old cable 103 at a desired location along the old cable 103 and a detection by the weak signal detector 110 is indicated to the cable handling worker by the signal indicator 111, such that the cable handling worker can identify the old cable 103 to be cut off at the cable laying space, non-destructively.

Here, the old cable 103 is usually a part of a bundle of a number of cables, so that in order to remove this old cable 103 alone, it is necessary to cut this old cable 103 into many pieces, by carrying out the cutting operation at number of positions along the old cable 103. On the other hand, when the old cable 103 is cut at one position, the closed loop of the old cable 103 is opened, such that the transmission of the identification signal becomes difficult.

For this reason, conventionally, markings are marked to the cutting positions on the old cable 103 determined in the manner described above in advance, before the actual cutting operations are carried out.

However, this procedure is rather involved one, which is both tedious as well as time consuming, so that this conventional cutting cable discrimination apparatus using the signal injector 108, the weak signal detector 110, and the signal indicator 111 is hardly used in practice.

In addition, in this conventional cutting cable discrimination apparatus, the apparatus itself is too expensive to equip every one of numerous cable handling work cites with this cutting cable discrimination apparatus permanently.

Moreover, because the detection sensitivity of the weak identification signal is low, it is difficult to detect the weak leakage of the identification signal from a cable laid near a center of the bundle of a plurality of cables.

It is to be noted here that, in principle, it is also possible to detect the identification signal transmitted through the old cable 103 even without a closed loop at another end 109, provided that the injected identification signal is sufficiently powerful.

However, in practice, this procedure tends to result in a failure to detect the very weak leakage of the identification signal by the weak signal detector 110.

SUMMARY OF THE INVENTION

It is therefore an object of the present invention to provide a cable cutting apparatus incorporating a mechanism for preventing the erroneous cutting of the cables in use, which is both inexpensive and simple.

According to one aspect of the present invention there is provided a cable cutting apparatus, comprising: cutting mechanism having cutting blades for cutting a cable; core potential recognition means for recognizing a potential of the cutting blades in contact with a core of the cable as one of a potential for a cable in use and a potential for a cable out of use; and locking mechanism means for locking cutting movements of the cutting blades of the cutting mechanism whenever the core potential recognition means recognizes the potential of the cutting blades in contact with the core of the cable as the potential for a cable in use.

According to another aspect of the present invention there is provided a method of cutting a cable, comprising the steps of: bringing cutting blades into contact with a core of the cable; recognizing a potential of the cutting blades brought into contact with the core of the cable at the bringing step as one of a potential for a cable in use and a potential for a cable out of use; cutting the cable by the cutting blades when the potential of the cutting blades in contact with the core of the cable is recognized as the potential for a cable out of use at the recognizing step; and locking cutting movements of the cutting blades whenever the potential of the cutting blades in contact with the core of the cable is recognized as the potential for a cable in use at the recognizing step. Other features and advantages of the present invention will become apparent from the following description taken in conjunction with the accompanying drawings.

BRIEF DESCRIPTION OF THE DRAWINGS

FIG. 5 is a block diagram of a second embodiment of a cable cutting apparatus according to the present invention.

FIG. 6 is a schematic cross sectional view of a cutting mechanism portion of the cable cutting apparatus of FIG. 5.

DETAILED DESCRIPTION OF THE PREFERRED EMBODIMENTS

Figure 1A:
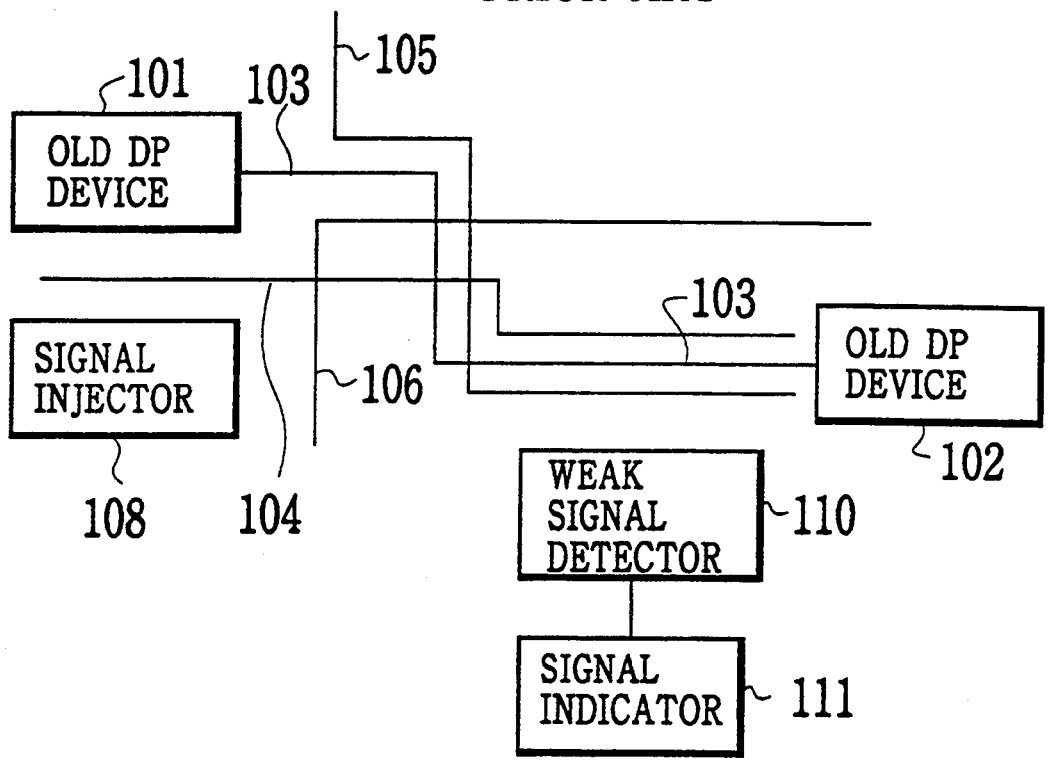
FIG. 1A is a schematic diagram of a situation in which a conventional cutting cable discrimination apparatus is used.
Figure 1B:
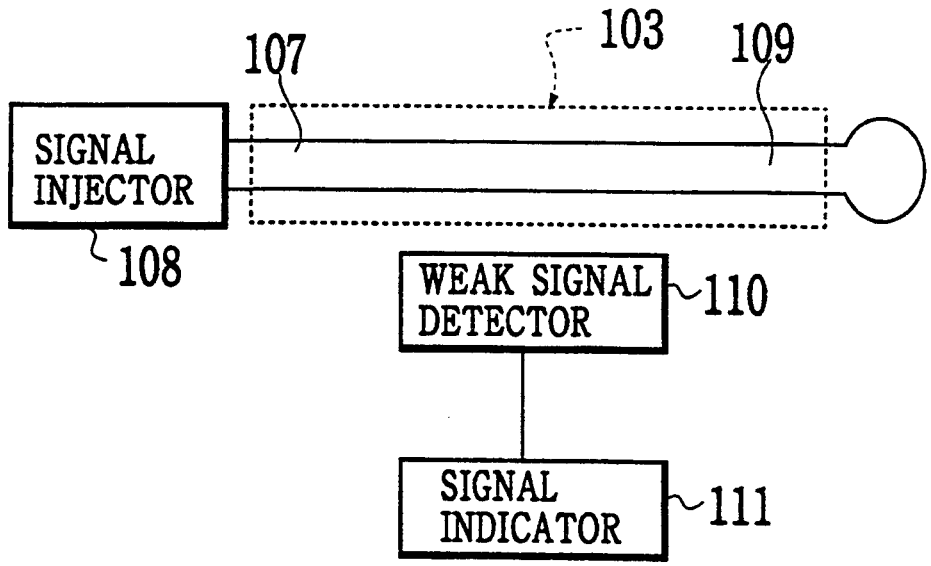
FIG. 1B is a schematic diagram showing a manner of using the conventional cutting cable discrimination apparatus of FIG. 1A in detail.
Figure 2:
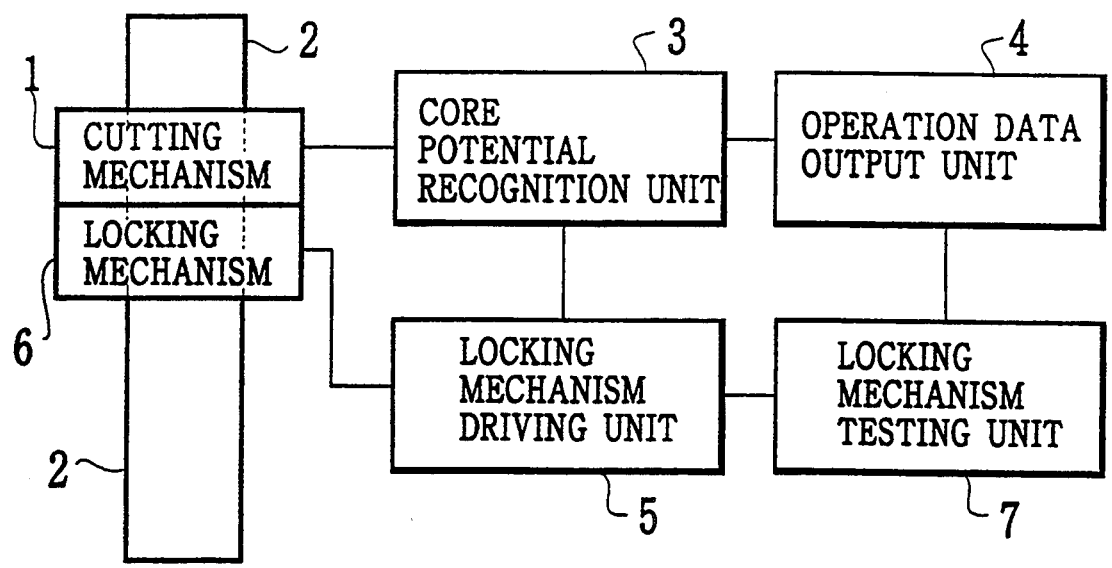
FIG. 2 is a block diagram of a first embodiment of a cable cutting apparatus according to the present invention.
Figure 3:
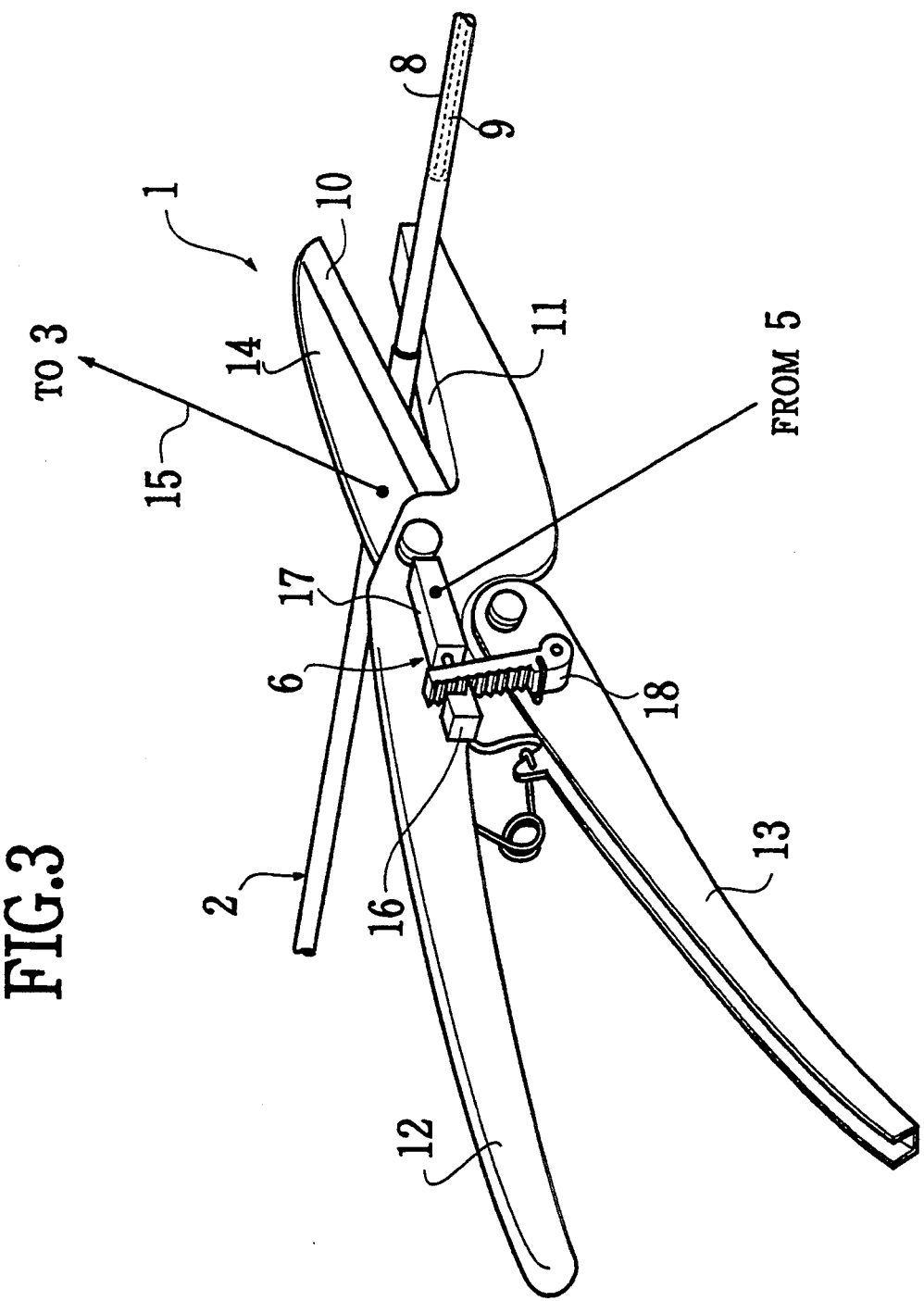
FIG. 3 is a perspective view of a cutting mechanism portion and a lock mechanism portion of the cable cutting apparatus of FIG. 2.
Figure 4:
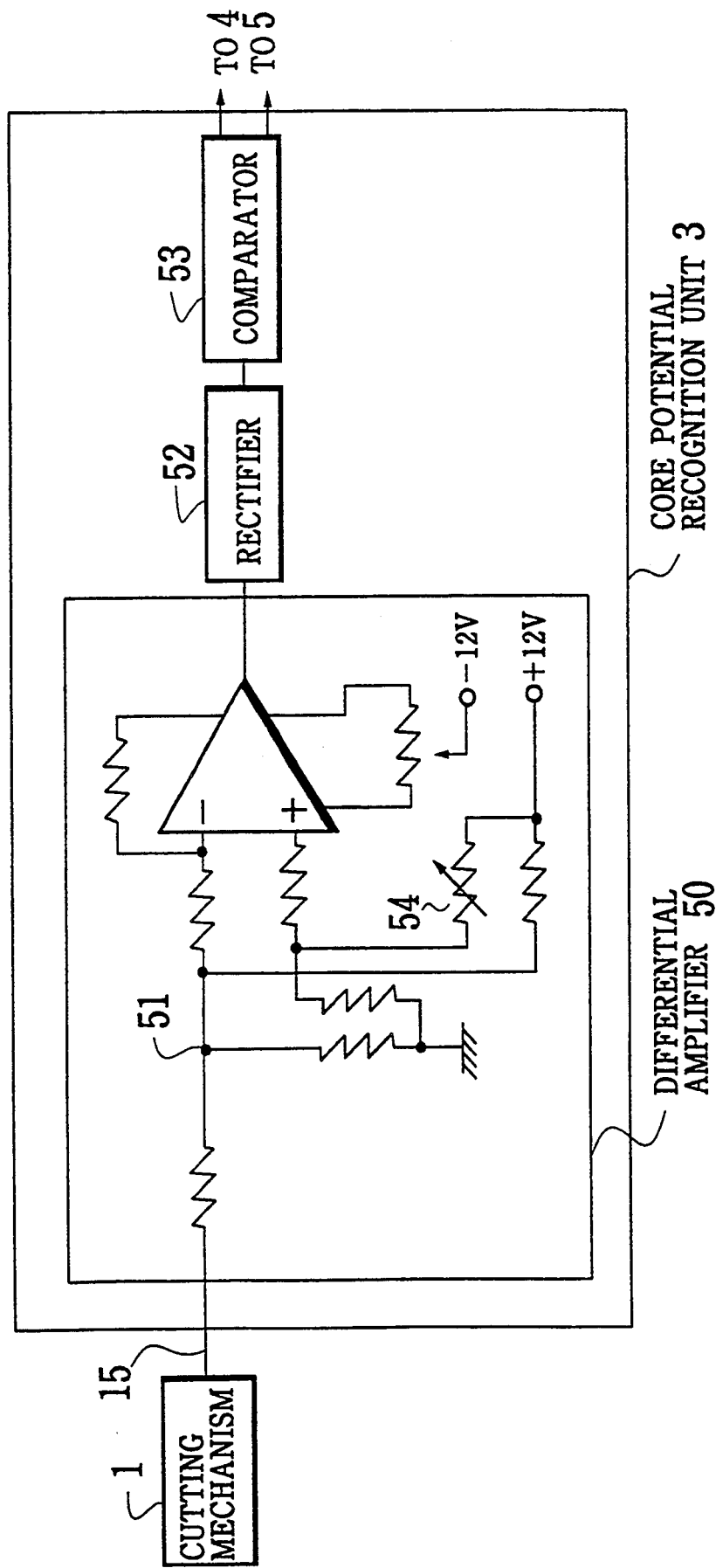
FIG. 4 is a detailed block diagram of a core potential recognition unit of the cable cutting apparatus of FIG. 2.

Referring now to FIG. 2 to FIG. 4, a first embodiment of a cable cutting apparatus according to the present invention will be described in detail.

In this first embodiment, as shown in FIG. 2, the apparatus generally comprises: a cutting mechanism 1 in a form of scissors having cutting blades for cutting a cable 2, and detecting a potential of a core of the cable 2 before the cutting; a core potential recognition unit 3 for recognizing the potential of the cutting blades in contact with the core of the cable 2 (referred hereafter as a core potential) detected by the cutting mechanism 1 as either one of a potential of a cable in use (e.g., AC, DC, or ground potential) or a potential of a cable in a floating state (i.e., a state in which both ends of a cable are disconnected); an operation data output unit 4 including a buzzer and a warning lamp for warning a cable handling worker when the core potential recognition unit 3 recognizes the detected core potential as the potential of a cable in use; a locking mechanism 6 provided on the cutting mechanism 1 for locking the cutting movement of the cutting mechanism 1; a locking mechanism driving unit 5 for driving the locking mechanism 6 according to the result of the recognition made by the core potential recognition unit 3; and a locking mechanism testing unit 7 for supplying a test signal to carry out a test of an operation of the locking mechanism 6 to the locking mechanism driving unit 5 in response to a pressing by the cable handling work of a test start button (not shown) provided thereon.

More specifically, the cutting mechanism 1 and the locking mechanism 6 have the detailed configuration as shown in FIG. 3.

Namely, the cutting mechanism 1 comprises a pair of metallic cutting blades 10 and 11 pivoted together and continuously formed with handles 13 and 12, respectively, in a form of scissors, where a blade body 14 of an upper cutting blade 10 Is electrically connected to the core potential recognition unit 3 through a potential transmission line 15 to transmit the core potential while the upper cutting blade 10 is in contact with the core of the cable 2. The handles 12 and 13 are made of insulative materials in order to protect the cable handling worker's hand from the electric shock.

On the other hand, the locking mechanism 6 comprises a rack shaped metal plate member 18 pivotally attached to a lower handle 13, a stopper piece 16 attached to an upper handle 12; and an electromagnet 17 for pushing the metal plate member 18 toward the stopper piece 16 such that a rack shaped side of the metal plate member 18 engages with the stopper piece 16 to prevent the further movement of the handles 12 and 13, under the control of the locking mechanism driving unit 5.

Also, as shown in FIG. 3, in this first embodiment, the cable 2 comprises an insulative covering member 8 and a core 9 covered by the covering member 8. When this cable 2 is a cable to be cut, the both ends of this cable 2 are disconnected from the data processing devices, before the cable handling work using the cable cutting apparatus is carried out.

On the other hand, the core potential recognition unit 3 has a detailed configuration as shown in FIG. 4, which comprises: a differential amplifier 50 for differentially amplifying the core potential transmitted from the cutting mechanism 1 through the potential transmission line 15; a rectifier 52 for rectifying the output of the differential amplifier 50 to obtain a positive component of the output of the differential amplifier 50; and a comparator 53 for comparing the positive component obtained by the rectifier 52 with a predetermined threshold to distinguish the potential of a cable in use from the potential of a cable in a floating state, so as to obtain control signals to be supplied to the operation data output unit 4 and the locking mechanism driving unit 5.

Here, the differential amplifier 50 has a node 51 whose potential is shifted by a resistive division between a reference potential of $+12$ V and and a ground potential, to which the core potential transmitted from the potential transmission line 51 is supplied, such that the core potential superposed onto this node 51 is differentially amplified. In general, a differential amplifier has a dead point at whose potential the differentially amplified output cannot be obtained. For this reason, the differential amplifier 50 of this first embodiment further incorporates a variable resistor 54 for shifting this dead point to a potential which is normally unrealistic for the core potential of the cable 2. Consequently, this differential amplifier 50 is capable of obtaining the differentially amplified output from any of the AC, DC, and ground potentials transmitted through the potential transmission line 15.

Thus, the cable cutting apparatus of this first embodiment operates as follows.

First, the cable 2 is pinched between the upper and lower cutting blades 10 and 11 of the cutting mechanism held by the cable handling worker's hand, and the cable handling worker grasp the handles 12 and 13 to cut the insulative covering member 8 of the cable 2 alone, such that the upper and lower cutting blades 10 and 11 are put in direct contact with the core 9 of the cable 2. At this point, the blade body 14 of the upper cutting blade 10 is put into the same potential as the core 9 of the cable 2, so that the core potential can be transmitted through the potential transmission line 15 to the core potential recognition unit 3.

In response, the core potential recognition unit 3 recognizes the transmitted core potential as either one of a potential of a cable in use or a potential of a cable in a floating state.

In a case the core potential is recognized as the potential of a cable in use, the core potential recognition unit 3 outputs the control signals to the operation data output unit 4 and the locking mechanism driving unit 5 such that the buzzer and the warning lamp of the operation data output unit 4 are activated to warn the cable handling worker that the cable 2 currently pinched between the cutting blades 10 and 11 is a cable in use, while the locking mechanism driving unit 5 controls the locking mechanism 6 to lock the cutting movement of the cutting mechanism 1.

Consequently, the further cutting of the cable 2 that is actually a cable in use by the cutting mechanism 1 is prevented as the further movement of the handles 12 and 13 by the cable handling worker is prevented by the locking mechanism 6, while the cable handling worker is notified by the operation data output unit 4 that the cable 2 is a cable in use that should not be cut.

On the other hand, in a case the core potential is recognized as the potential of a cable in a floating state, the cable 2 which is a cable to be cut can be cut by the cutting blades 10 and 11 as the cable handling worker further grasps the handles 12 and 13.

In this first embodiment, a locking operation time required from the detection of the core potential by the upper cutting blade 10 to the activation of the locking mechanism 6 is approximately 4.5 msec, so that the erroneous cutting of the core 9 of the cable 2 can be prevented effectively.

Also, the cable cutting apparatus of this first embodiment can be manufactured at a considerably smaller cost of approximately one fifth compared with the conventional cutting cable discrimination apparatus.

Moreover, the cable cutting apparatus of this first embodiment can be operated in a very simple manner similar to that required by conventionally used cable cutting scissors, so that there is no need for the tedious and time consuming procedure such as the marking of the cutting positions in advance.

It is to be noted that the electromagnet 17 used in the locking mechanism 6 described above may be replaced by a piezoelectric element in order to shorten the locking operation time. Here, in order to increase a distance by which the metal plate member 18 can be pushed so as to improve the engagement and disengagement of the rack shaped side of the metal plate member 18 with the stopper piece 6, a laminated type piezoelectric element is suitable.

It is also to be noted that this first embodiment is applicable not only to a single core type cable 2 described above, but also to a coaxial type cable and a multi-core type cable as well. Here, however, in a case of the multi-core type cable, it is possible for a part of the multi-core to be in the floating state, and in such a case, it is impossible to prevent the accidental cutting of the floating part of the multi-core by the cable cutting apparatus of this first embodiment, although a majority of the multi-core can be saved from the accidental cutting even in such a case.

Referring now to FIG. 5 and FIG. 6, a second embodiment of a cable cutting apparatus according to the present invention will be described in detail. Here, those elements which are equivalent to the corresponding elements in the first embodiment described above will be given the same reference numerals and their detailed descriptions will not be repeated.

This second embodiment of FIG. 5 differs from the first embodiment of FIG. 2 described above in that the cutting mechanism 1 of a manual operation type and the locking mechanism 6 used in the first embodiment are replaced by an automatic operation type cutting and locking mechanism 21, and the locking mechanism driving unit 5 and the locking mechanism testing unit 7 used in the first embodiment are replaced by a cutting and locking mechanism driving unit 19 for controlling the operation of this automatic operation type cutting and locking mechanism 21 according to the core potential recognized by the core potential recognition unit 3.

More specifically, in this second embodiment, the automatic operation type cutting and locking mechanism 21 has a configuration as shown in FIG. 6, which comprises: a lower support blade 22 to be put against a lower side of the cable 2; an upper detection blade 23 and an upper cutting blade 24 to be put against an upper side of the cable 2; and an automatic operation control unit 20 for controlling movements of the upper detection blade 23 and the upper cutting blade 24 with respect to the lower support blade 22 which has a fixed position with respect to the automatic operation control unit 20; where the upper detection blade 23 is electrically connected with the potential transmission line 15. Here, a sharp edge of the upper detection blade 23 is protruding from a flattened edge of the upper cutting blade 24 by a thickness of the covering member 8 of the cable 2, where the relative position of the upper detection blade 23 and the upper cutting blade 24 can be adjusted by an adjusting mechanism (not shown) provided in the automatic operation control unit 20.

In this automatic operation type cutting and locking mechanism 21, after the cable 2 is placed on the lower support blade 22, the automatic operation control unit 20 moves the upper detection blade 23 and the upper cutting blade 24 downwards in a direction of an arrow indicated in FIG. 6, under the control by the cutting and locking mechanism driving unit 19, by a relatively weak driving force, such that the cable 2 is pinched between the lower support blade 22 and the upper cutting blade 24 while the sharp edge of the upper detection blade 23 cuts the covering member 8 of the cable 2 and reaches to the core 9 of the cable 2 and then stops. Here, the relatively weak driving force is set to be so weak that the flattened edge of the upper cutting blade 24 cannot cut into the covering member 8 of the cable 2.

At this point, the upper detection blade 23 is in contact with the core 9 of the cable 9, so that the core potential is transmitted through the potential transmission line 15 to the core potential recognition unit 3. Then, the core potential recognition unit 3 recognizes the transmitted core potential as either one of a potential of a cable in use or a potential of a cable in a floating state.

In a case the core potential is recognized as the potential of a cable in use, the core potential recognition unit 3 outputs the control signals to the operation data output unit 4 and the cutting and locking mechanism driving unit 19, in a manner similar to that of the first embodiment described above. Here, the function of the locking mechanism 6 in the first embodiment described above can also be fulfilled by the automatic operation control unit 20 of the automatic operation type cutting and locking mechanism 21, under the control by the cutting and locking mechanism driving unit 19.

On the other hand, in a case the core potential is recognized as the potential of a cable in a floating state, the automatic operation control unit 20 moves the upper detection blade 23 and the upper cutting blade 24 further downwards in a direction of an arrow indicated in FIG. 6, under the control by the cutting and locking mechanism driving unit 19, by a relatively strong driving force, such that the cable 2 is cut by the upper detection blade 23 and the upper cutting blade 24. Here, the relatively strong driving force is automatically set to be sufficiently strong for the flattened edge of the upper cutting blade 24 to cut the covering member 8 and the core 9 of the cable 2.

Thus, in this second embodiment, the operation of the cutting and locking mechanism 21 for detecting the core potential, and cutting the cable 2 or stopping the cutting movements can be carried out automatically by the automatic operation control unit 20 under the control of the cutting and locking mechanism driving unit 19, so that the erroneous cutting of the core 9 of the cable 2 can be prevented very safely, regardless of the skill of the cable handling worker.

It is to be noted that the automatic operation control unit 20 may incorporate a position control mechanism for controlling positions of the upper detection blade 23 and the upper cutting blade 24 independently, so as to be able to control the depth of cutting to be made by each of the upper detection blade 23 and the upper cutting blade 24 appropriately, in accordance with the type of the cable 2 to be handled.

It is also to be noted that the upper detection blade 23 may be provided separately from the upper cutting blade 24 as described above, in order to be able to replace the upper detection blade 23 alone when the sharp edge of the upper detection blade 23 is damaged. Alternatively, the upper detection blade 23 and the upper cutting blade 24 may be provided integrally, if desired.

Now, using the cable cutting apparatus of the first or second embodiment of the present invention described above, it becomes possible to change the overall procedure of the cable handling work as follows.

(1) It is made sure that the cable layout design specification is updated for every cable handling work. (This has nothing to do with the cable cutting apparatus of the present invention, although this is a very important factor for the successful execution of the cable handling works.)

(2) Assuming that the cable layout design specification has been reliably updated, the cable cutting operation is carried out according to the cable layout design specification. (Here, the marking of the cutting positions in advance at the cable handling work cite required conventionally is omitted.)

(3) In a case of the accidental or erroneous cutting of a cable in use, the accidental or erroneous cutting can be detected immediately by using the cable cutting apparatus of the present invention, so that the cutting operation is interrupted before the complete cutting of the cable in use.

(4) The repair (re-connection) of the accidentally or erroneously cut portion of the cable in use is carried out, before the cutting operation is resumed. (Here, the accidental or erroneous cutting made at (3) is only a partial cutting, so that the repair can be made relatively quickly.)

Thus, according to this overall procedure of the cable handling work using the cable cutting apparatus of the present invention, the complete cutting of the important cable in use by accident or by error can be totally prevented, and the time required for the repair of the accidental or erroneous cutting of the cable in use can be reduced considerably compared with the conventional procedure in which the accidental or erroneous cutting of the cable in use inevitably results in the complete cutting of the cable in use.

Consequently, the out of service period for the data processing devices due to the accidental cutting of the cable in use by the cable handling worker can be reduced, while the cable handling worker can be relieved of the fear for making the accidental complete cutting of the cable in use.

It is to be noted that, apart from the above described procedure for the cable handling work using the cable cutting apparatus of the present invention, the cable cutting apparatus of the present invention may be employed in a conventional procedure for the cable handling work.

Also, in the above described procedure for the cable handling work using the cable cutting apparatus of the present invention, the conventional cutting cable discrimination apparatus may be employed in addition.

It is further to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A cable cutting apparatus, comprising:
   cutting mechanism having cutting blades for cutting a cable;
   core potential recognition means for recognizing a potential of the cutting blades in contact with a core of the cable as one of a potential for a cable in use and a potential for a cable out of use; and
   locking mechanism means for locking cutting movements of the cutting blades of the cutting mechanism whenever the core potential recognition means recognizes a potential of the cutting blades in contact with the core of the cable as the potential for a cable in use.

2. The cable cutting apparatus of claim 1, wherein the cutting mechanism is in a form of manually operable scissors.

3. The cable cutting apparatus of claim 2, wherein the locking mechanism means comprises a plate member having a rack shaped surface which is pivotally attached to a handle of the scissors, a stopper member attached to another handle of the scissors which is engageable with the rack shaped surface of the plate member, and means for pushing the plate member toward the stopper member to put the stopper member in engagement with the rack shaped surface of the plate member such that the engagement of the plate member and the stopper member prevents relative movement of the handles of the scissors.

4. The cable cutting apparatus of claim 1, wherein the cutting mechanism is in a form of a control mechanism for pressing the cutting blades automatically at predetermined driving forces.

5. The cable cutting apparatus of claim 4, wherein the predetermined driving forces include a relatively weak driving force for bringing the cutting blades in contact with the core of the cable and a relatively strong driving force for cutting the cable.

6. The cable cutting apparatus of claim 5, wherein the locking mechanism means is in a form of means for stopping the control mechanism from applying the relatively strong driving force to the cutting blades.

7. The cable cutting apparatus of claim 4, wherein the cutting blades include a detection blade member to make contact with the core of the cable for detecting a potential of the core of the cable, a cutting blade member to cut the cable in conjunction with the detection blade member, and a support blade member to support the cable and receive the detection blade member and the cutting blade member at a time of cutting of the cable.

8. The cable cutting apparatus of claim 1, wherein the core potential recognition means recognizes the potential of the cutting blades in contact with the core of the cable as the potential for a cable out of use when the potential of the cutting blades In contact with the core of the cable is a potential for a cable in a floating state.

9. The cable cutting apparatus of claim 1, wherein the core potential recognition means includes a differential amplifier for differentially amplifying the potential of the cutting blades in contact with the core of the cable.

10. The cable cutting apparatus of claim 9, wherein the differential amplifier incorporates a variable resistor for shifting a dead point of the differential amplifier.

11. The cable cutting apparatus of claim 1, further comprising means for notifying a cable handling worker using the cable cutting apparatus about a recognition of the potential of the cutting blades in contact with the core of the cable by the core potential recognition means as the potential for a cable in use.

12. The cable cutting apparatus of claim 1, further comprising test means for testing the locking mechanism means by forcefully activating the locking mechanism means regardless of the potential of the cutting blades in contact with the core of the cable recognized by the core potential recognition means.

13. A method of cutting a cable, comprising the steps of:
   bringing cutting blades into contact with a core off the cable;
   recognizing a potential of the cutting blades brought into contact with the core of the cable at the bringing step as one of a potential for a cable in use and a potential for a cable out of use;
   cutting the cable by the cutting blades when the potential of the cutting blades in contact with the core of the cable is recognized as the potential for a cable out of use at the recognizing step; and
   locking cutting movements of the cutting blades whenever the potential of the cutting blades in contact with the core of the cable Is recognized as the potential for a cable in use at the recognizing step.

14. The method of claim 13, wherein at the bringing step and the cutting step, the cutting blades are operated manually.

15. The method of claim 14, wherein at the locking step, the cutting movements of the cutting blades are locked by pushing a plate member having a rack shaped surface which is pivotally attached to one of the cutting blades toward a stopper member attached to another one of the cutting blades which is engageable with the rack shaped surface of the plate member, to put the stopper member in engagement with the rack shaped surface of the plate member such that the engagement of the plate member and the stopper member prevents a manual operation of the cutting blades.

16. The method of claim 13, wherein at the bringing step and the cutting step, the cutting blades are pressed toward each other automatically at predetermined driving forces.

17. The method of claim 16, wherein the predetermined driving forces include a relatively weak driving force for bringing the cutting blades in contact with the core of the cable and a relatively strong driving force for cutting the cable.

18. The method of claim 17, wherein at the locking step, the cutting movements of the cutting blades are locked to prevent applying the relatively strong driving force to the cutting blades.

19. The method of claim 13, wherein at the recognizing step, the potential of the cutting blades in contact with the core of the cable is recognized as the potential for a cable out of use when the potential of the cutting blades in contact with the core of the cable is a potential for a cable in a floating state.

20. The method of claim 13, further comprising the step of notifying a cable handling worker about a recognition of the potential of the cutting blades in contact with the core of the cable at the recognizing step as the potential for a cable in use.

* * * * *